US007394590B2

(12) United States Patent
Iizuka et al.

(10) Patent No.: US 7,394,590 B2
(45) Date of Patent: Jul. 1, 2008

(54) CONTROL DEVICE AND CONTROL METHOD OF OPTICAL AMPLIFIER

(75) Inventors: Hiroshi Iizuka, Kawasaki (JP); Kousuke Komaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 295 days.

(21) Appl. No.: 11/017,160

(22) Filed: Dec. 21, 2004

(65) Prior Publication Data
US 2006/0056011 A1    Mar. 16, 2006

(30) Foreign Application Priority Data
Sep. 16, 2004    (JP)    ............... 2004-270150

(51) Int. Cl.
*H01S 4/00*    (2006.01)
*H04B 10/12*    (2006.01)

(52) U.S. Cl. ............... 359/337; 359/341.41; 359/341.42

(58) Field of Classification Search ............ 359/341.41, 359/341.42, 337
See application file for complete search history.

(56) References Cited

U.S. PATENT DOCUMENTS

| 6,215,584 | B1* | 4/2001 | Yang et al. ................ 398/160 |
| 6,606,191 | B1* | 8/2003 | Gerrish et al. ............ 359/341.4 |
| 2001/0040721 | A1* | 11/2001 | Gerrish et al. ......... 359/341.41 |
| 2002/0039226 | A1* | 4/2002 | Murakami et al. .......... 359/337 |
| 2003/0106990 | A1 | 6/2003 | Tomofuji et al. ............ 250/214 |
| 2004/0051938 | A1* | 3/2004 | Chan et al. ............... 359/337.1 |

FOREIGN PATENT DOCUMENTS

JP    2003-174421    6/2003

\* cited by examiner

*Primary Examiner*—Jack W. Keith
*Assistant Examiner*—Eric Bolda
(74) *Attorney, Agent, or Firm*—Staas & Halsey LLP

(57) ABSTRACT

There are provided an ASE correction unit which corrects control errors regarding either or both of the gain and the output level of the optical amplifier, which control errors are generated due to the ASE, and an ASE correction controller which controls the correction of the control errors by these ASE correction unit based on a predetermined time constant. Accordingly, the ASE correction errors of the optical amplifier, which performs the ASE correction are suppressed, and stabilization of the output signal light level and the optical amplification gain at the time of changes of the wavelength number can be attained.

7 Claims, 9 Drawing Sheets

CONTROL DEVICE AND CONTROL METHOD OF OPTICAL AMPLIFIER

CROSSREFERENCE TO RELATED APPLICATIONS

This application is based on and hereby claims priority to Japanese Application No. 2004-270150 filed on Sep. 16, 2004 in Japan, the contents of which are hereby incorporated by reference.

BACKGROUND OF THE INVENTION (1) Field of the Invention

The present invention relates to a control device and a control method of an optical amplifier, and more particularly to a control device and a control method of an optical amplifier suitably applicable to a constant output control and a constant-gain control of an optical amplifier.

(2) Description of Related Art

Today, a wavelength division-multiplexing (WDM) device, which increases a transmission capacity by inputting into one transmission line (optical fiber) a plurality of optical signals with different wavelengths, has been widespread. Moreover, in an optical ring network, as an optical transmission device (optical node), which enables the increase and decrease of an arbitrary wavelength regarding a multiplexed WDM light in the middle of the transmission line, an OADM (Optical Add-Drop Multiplex) device has also been put to practical use.

In the WDM optical-communications system described here, there is a need to control the output signal light power per one wave to be constant by controlling the amplification gain to be constant in the optical amplifier even when the wavelength number of the WDM light changes. For this reason, an optical amplifier is needed that responds at high-speed to the increase and decrease of the wavelength. In controlling optical amplifiers today, this high-speed response control is generally executed by an automatic gain control (AGC).

Moreover, under the conditions that optical amplifiers are coupled in multi-stages like a long-distance WDM optical communications system, if there occurs a change in the transmission line loss due to the temperature, or aging and the like of the transmission fibers, the transmission fibers would incur a deterioration of the transmission quality if only AGC would be used. Then, in order to absorb input fluctuations (input dynamic range) per one wave and obtain a constant signal output level (power), there is a need to execute ALC (Automatic Level Control) in addition to AGC, combined with it.

In FIG. 9, a configuration of the conventional optical amplifier, which uses such AGC combined with ALC, is shown. The optical amplifier shown in FIG. 9 is constituted as an in-line amplifier of a two-stage amplification configuration, and is comprised of: as an optical circuit section, erbium-doped optical fibers (EDF) 100a and 100b which are optical amplification media; a variable optical attenuator (VOA) 101 for adjusting the optical level (the amount of loss) provided between such EDF 100a and 100b: beam splitters (BS) 102a and 102b, photo-diodes (PD) 103 and 104, which constitute a monitoring circuit of the input/output light level of EDF 100a in the pre-stage; an excitation light source (LD) 105 and a WDM coupler (wavelength coupler) 106 which constitute an excitation light circuit for EDF 100a; BS 107a as well as 107b and PD 108 as well as 109 which constitute a monitoring circuit of the input/output light level of EDF 100b arranged in the post-stage; and an excitation light source (LD) 110 and an WDM coupler 111 which constitute an excitation light circuit for EDF 100b.

Moreover, as a control circuit section (an electric circuit section), there are also provided an AGC circuit 121 for EDF 100a of the pre-stage, an AGC circuit 122 for EDF 100b in the post-stage, and an ALC circuit 123 which controls the amount of attenuation of VOA 101 as well as ASE correction circuits (adder) 124 and 125.

In the optical amplifier (EDFA) using such EDF, a total sum of the gain by each of EDF 100a and 100b and the loss in VOA 101 makes the gain (a total EDF gain) as the whole optical amplifier, and the total EDF gain can be changed by changing the gain of EDF 100a and 100b, or the amount of loss in VOA 101.

Specifically, in the above-described optical amplifier, a WDM light inputted from a signal input terminal is amplified in EDF 100a, and after the output level thereof (namely, an input level to EDF 100b in the post-stage) being adjusted in VOA 101, is then amplified again in EDF 100b and outputted. Then, at this time, a part of the input/output light in each of EDF 100a and 100b is branched out in BS 102a as well as 102b, and BS 107a as well as 107b, respectively, and the input/output light power of each of EDF 100a and 100b is monitored in PD 103 as well as 104, and in PD 108 as well as 109, respectively. Namely, each of PD 103, 104, 108 and 109 inputs an electric signal (a voltage value) corresponding to the input light quantity into corresponding AGC circuits 121 and 122, respectively.

In the AGC section (AGC circuits 121 and 122), an AGC is carried out including the power fluctuation of an input signal light. Namely, the output power (an excitation light power) of LDs 105 and 110 is controlled based on the input voltage value from each of PDs 103, 104, 108 and 109, such that the total EDF gain is kept at a predetermined constant value (such that the ratio of the input light level of EDF 100a in the pre-stage and the output light level of EDF 100b in the post-stage may be constant).

On the other hand, in the ALC circuit 123, in order to absorb the input fluctuation per one wave (input dynamic range) and obtain a constant output signal light level, the total EDF gain is changed in the direction of suppressing the power fluctuation of the input signal light by adjusting the amount of loss in VOA 101, based on the monitoring value of PD 109 (that is, the output light level of EDF 100b in the post-stage).

Accordingly, when the input light power fluctuates at a speed sufficiently slower than the speed of the response (time constant) of the ALC circuit 123, it is possible to completely suppress a fluctuation of the input light power within the input dynamic range and control the total EDF gain to a predetermined value.

Incidentally, as described in the following Patent Document 1, a time constant of the AGC is set sufficiently short with respect to the response time (length of time from a time of the excitation light power having changed until the gains of EDF 100a and 100b being adjusted to the desired values corresponding to the changes thereof; usually several milli seconds) of EDFs 100a and 100b, so as to sufficiently cope with the wavelength number fluctuation (the increase and decrease of the wavelength) of the input signal light, as described above. On the other hand, the time constant of the ALC is set, for example, so as to be longer (such as 10 or more times and the like) than the time required for a supervisory control signal to be transmitted to each optical node through OSC (Optical Supervisory Channel).

Incidentally, in the optical amplifier using EDF, ASE (Amplified Spontaneous Emission), which becomes a noise component along with the amplification of the input light, is generated as described in the paragraphs 0053 and 0054 of the Patent Document 1. For this reason, on the assumption that the input light power (the total power) for the optical amplifier is designated by "Pin", the input light power per one wave to the optical amplifier by "Pin_ch", the output light power (the total power) by "Pout", the signal gain by "G", the ASE output generated in its own stage by "Pase", and the wavelength number by "m", the gain set by the AGC is expressed by the following equation (1), and an error due to the ASE will be generated in association with the signal gain G which is a desired gain. And, this error depends on the multiplexing number of the wavelength of the WDM light.

$$AGC\ gain = Pout/Pin = (G \times Pin + Pase)/Pin \quad (1)$$

$$= G + Pase/(m \times Pin\_ch)$$

Therefore, it is apparent that the AGC gain has only to be increased in association with the signal gain G only by the amount of Pase/(m×Pin_ch). Then, in the conventional optical amplifier shown in FIG. 9, the ASE correction value (=Pase/G) is reflected on the input information (the monitoring value of the input light power of EDF 100a and 100b) to the AGC section (AGC circuits 121 and 122) by means of the adders 124 and 125. In addition, in some cases the ASE correction value is reflected on the monitoring value of the output light power of EDFs 100a and 100b (refer to FIG. 11 of the Patent Document 1). Moreover, as described in the paragraph 0058 of the Patent Document 1, as for also the ALC the ASE correction value is also reflected. In addition, the details of such ASE correction are described, for example, in the paragraphs 0055 and 0056 of the Patent Document 1.

[Patent Document 1]

Japanese Patent Laid-Open (Kokai) 2003-174421.

Incidentally, since the above-described "ASE correction value" is significantly dependent on the input light power per one wave, the "ASE correction value" always needs to be changed at the time of ALC in which the input light level per one wave is likely to fluctuate. The control value thereof is set based on the input light power per one wave level (Pin_ch), and is, therefore, the value which originally is not subjected to any change by the fluctuation of the wavelength number.

However, in the event that a fluctuation of the wavelength number has occurred during the ALC, it is assumed, until the correct wavelength number information can be obtained by the OSC or the like, that there is no changes in the wavelength number, with the result that changes of the input light power due to the fluctuation of the wavelength number are interpreted as changes in the input light level per one wave. As a consequence, an error would occur in the ASE correction value, and in configurations like the optical amplifier described above based on FIG. 9 or the technologies of the Patent Document 1, in which the ASE correction value is reflected on the desired control value of the total EDF gain or on the desired control value of VOA 101, an error would occur also in this desired control value.

Namely, in the control information (the gain of the whole optical amplifier, each EDF gain, ASE correction values, and the like) by which a desired value is set from the input light level per one wave, a control error would occur. As a result, the control value (the amount of attenuation) of VOA 101, which should originally be constant even at the time of the increase and decrease of the wavelength number, will change, and the transmission quality of the main signal light (WDM light) will degrade due to the influence of the gain deviation, and the like.

Moreover, in the device in which optical amplifiers are coupled in multi-stages, the ASE correction value generated in its own stage is notified by the OSC or the like to an optical amplifier arranged in the post-stage, and is used as the control information in this optical amplifier, however, when a fluctuation of the wavelength number occurs in the state of ALC, an accurate ASE correction value which should be generated in its own stage can not be calculated, therefore, a control using the ASE correction value at the time of the increase and decrease of the wavelength number cannot be carried out in the subsequent optical amplifier.

SUMMARY OF THE INVENTION

The present invention has been made in view of such problems, and it is intended to provide a control device and a control method of an optical amplifier, which can attain a stabilization of the output signal light level and the optical amplification gain at the time of the changes of the wavelength number, by suppressing the ASE correction error of the optical amplifier which performs the ASE correction.

In order to attain the above-described objects according to the present invention there is provided a control device for an optical amplifier by which amplified spontaneous emission (ASE) is generated in the output light along with the amplification of an input light, comprising: an ASE correction unit which corrects control errors regarding either or both of the gain and the output level of the optical amplifier, which control errors are generated due to the ASE; and an ASE correction controller which controls, based on a predetermined time constant, the control error correction by means of the ASE correction unit.

Herein the optical amplifier may comprise: a constant-gain controller which controls the gain of the optical amplifier so as to be constant; and a constant output level controller which controls the output level of the optical amplifier so as to be constant, the ASE correction unit comprising: a first ASE correction section which corrects control errors regarding the constant-gain control by means of the constant-gain controller, which control errors could be generated due to the ASE, based on a first ASE correction information; and a second ASE correction section which corrects control errors, regarding the constant output level control by means of the constant output level controller, which control errors could be generated due to the ASE, based on a second ASE correction information, and the ASE correction controller comprising an ASE correction information setting section which sets, with the time constant, the ASE correction information for the ASE correction section.

Moreover, the ASE correction controller may further comprise an ASE information transfer section which outputs, based on a predetermined time constant, an ASE information regarding said ASE to be transferred to other optical amplifiers.

Furthermore, the ASE correction controller may further comprise an ASE correction information fixing section, which fixes, upon receipt of the wavelength number information regarding the input light, each ASE correction information mentioned above to the information prior to receiving the wavelength number information, regardless of the time constant.

Moreover, according to the present invention there is provided a method of controlling an optical amplifier by which amplified spontaneous emission (ASE) is generated in the output light along with the amplification of an input light, comprising the steps of: an ASE correction step which corrects control errors, regarding either or both of the gain and the output level of the optical amplifier, which control errors are generated due to the ASE; and an ASE correction control step which controls, based on a predetermined time constant, the correction of the control errors due to the ASE correction step.

According to the above-described invention, the following effects or advantages are obtained.

(1) Occurrence of the ASE correction error can be reduced and a stability of the output level of an optical amplifier after the fluctuation of the wavelength number can be secured.

(2) Since ASE correction information having slight error is reflected on the gain control of the optical amplifier, degradation of the transmission quality, which is a matter of concern at the time of the fluctuation of the wavelength number, can be prevented.

(3) Because a deviation of the ASE correction information generated in the stage of its own is reduced, a control using the ASE correction information to be transferred to the next stage can be executed accurately regardless of the occurrence of the fluctuation of the wavelength number.

DESCRIPTION OF THE EMBODIMENTS

[A] Description of an Embodiment

Figure 1:
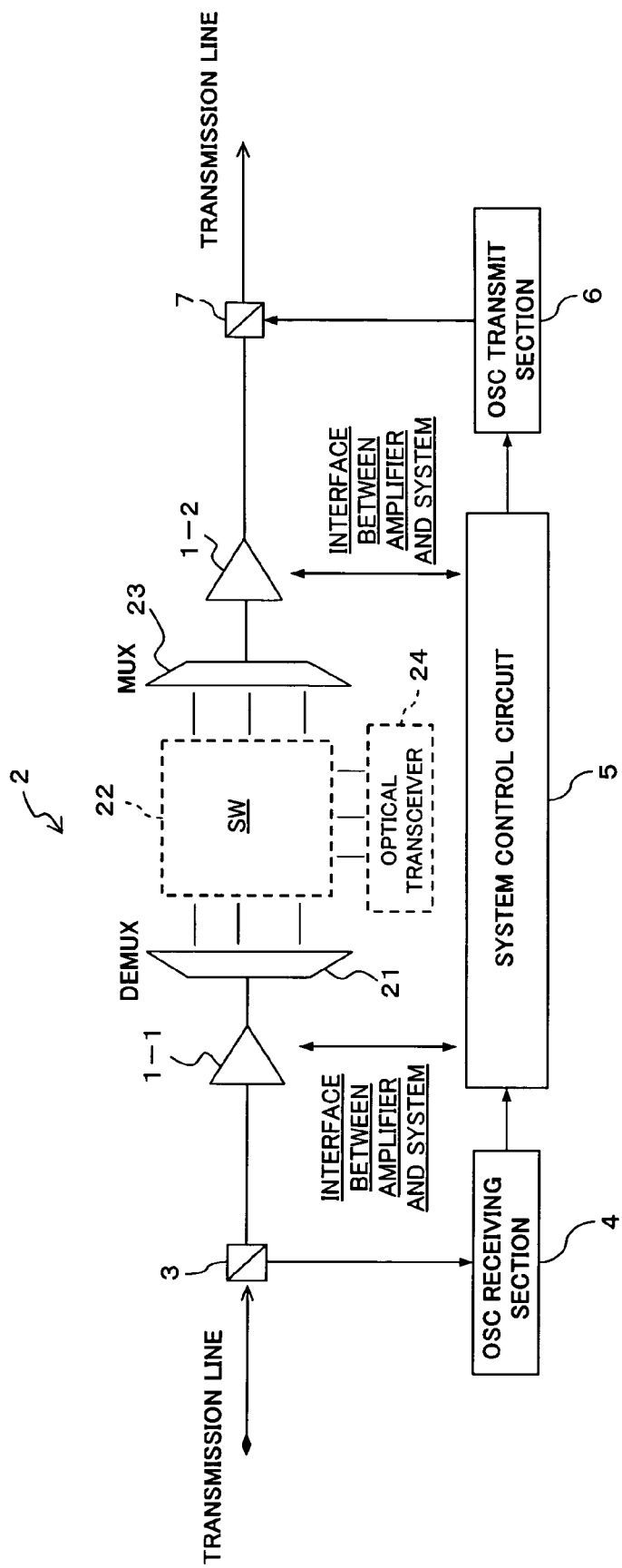
FIG. 1 is a block diagram showing a configuration of an optical transmission device to which a control device of an optical amplifier as an embodiment of the present invention is applicable.

FIG. 1 is a block diagram showing a configuration of an optical transmission device to which a control device of an optical amplifier as an embodiment of the present invention is applicable. This optical transmission device (an optical node) shown in FIG. 1 is constituted as an OADM node having an add/drop function, and in the embodiment, is comprised of: in the optical transmission device (the main signal device), an optical amplifier 1-1 which functions as a preamplifier; an optical amplifier 1-2 which functions as a post amplifier; and an optical cross connect section 2 being comprised of a wavelength demultiplexing section (DEMUX) 21, an optical switch (SW) 22, a wavelength multiplexing section (MUX) 23, and an optical transceiver 24 as its components, and at the same time, is comprised of, as the control device, a beam splitter (this may be also an optical coupler) 3, an OSC receiving section 4, a device control circuit 5, an OSC transmit section 6, and a WDM coupler 7.

Figure 2:
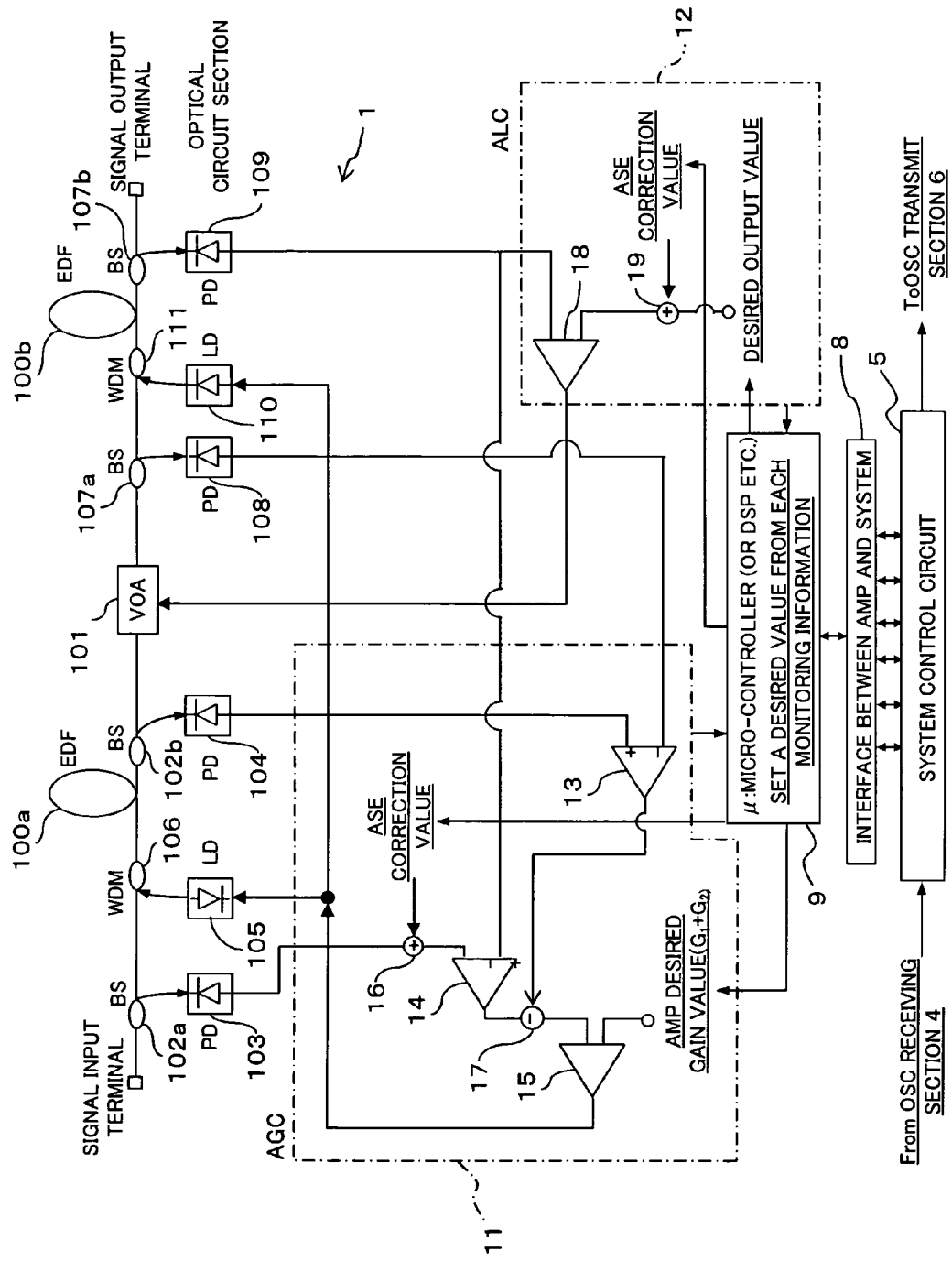
FIG. 2 is a block diagram showing the configuration of the optical amplifier shown in FIG. 1.
Figure 9:
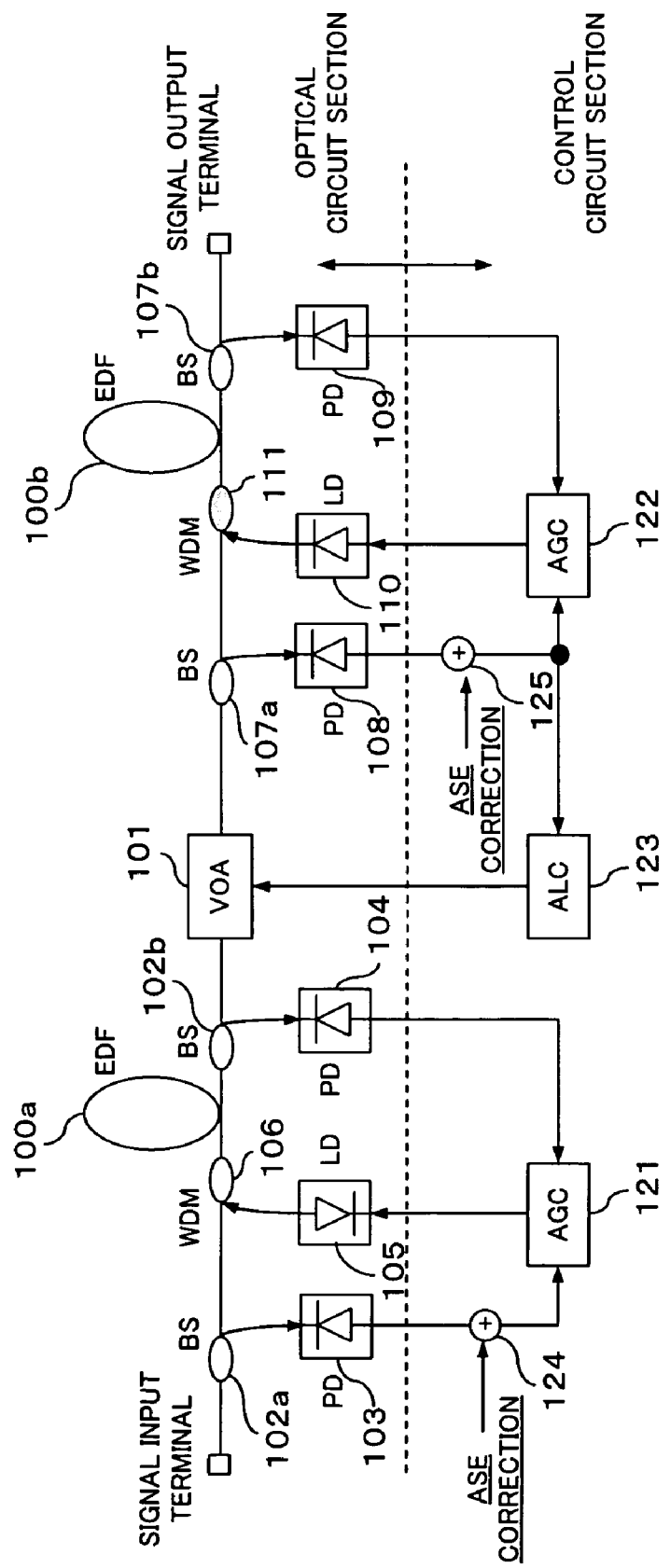
FIG. 9 is a block diagram showing a configuration of the conventional optical amplifier.

Here, each of the optical amplifiers 1-1 and 1-2 collectively wavelength-amplifies an input light (WDM light), in which a plurality of wavelengths are multiplexed, to a predetermined output level, respectively, and also in the present embodiment, as is the case with the configuration shown in FIG. 9, is constituted, as shown in FIG. 2, as an EDF light amplifier (EDFA) using optical fibers (EDF) 100a and 100b into which an erbium atom, which is one of the rare earth, is doped. It should be noted that in the event of making no distinction between the optical amplifiers 1-1 and 1-2, hereinafter, there is used a notation of simply "EDFA 1" or "EDFA 1-$k$" ($k$=1, 2, and so on).

The optical cross connect section 2 realizes a function of drop (branch) of a signal light with a specific wavelength from a low-speed optical transmission device, a function of add (insertion), to the main signal (the WDM light), of a signal light with a specific wavelength from a low-speed optical transmission device, a through function of a signal light with a specific wavelength, and the like, and after demultiplexing for each wavelength the WDM light into each wavelength in the wavelength demultiplexing section 21, can drop, in the optical switch 22, the received signal light with an arbitrary wavelength by switching to the optical transceiver 24 side, or letting it through to the wavelength multiplexing section 23, or switch a transmit light from the optical transceiver 24, as an add light, to the wavelength multiplexing section 23.

A beam splitter 3 branches a light contained, as a supervisory control wavelength (OSC) for a supervisory control, in the WDM light to a preamplifier 1-1, and the OSC receiving section 4 has functions to carry out a photo-electric conversion of the light of the OSC which is branched in this beam splitter 3, extract a supervisory-control information from the downstream side, and notify the a device control circuit 5.

The device control circuit 5 controls the operation of the whole OADM node 1, and possesses equipped with various kinds of functions, such as a control corresponding to the supervisory-control information received by the above-described OSC receiving section 4, and a generation of the supervisory-control information to be notified to the upstream side by the OSC, and can carry out also the setting (setting of the gain-desired value, the output power-desired value, and the like) required for each EDFA 1 via an interface 8 between the amplifier and the device (refer to FIG. 2).

The OSC transmit section 6 has a function to convert the supervisory-control information from the device control circuit 5 into the light of OSC and output, and a WDM coupler (wavelength coupler) 7 multiplexes the OSC light from the OSC transmit section 6 into the output light (WDM light toward the upstream side) of a post amplifier 1-2.

In addition, the control device of EDFA 1 is comprised of the above-described OSC receiving section 4, the device control circuit 5, the OSC transmit section 6, the interface between the amplifier and the device 8, and an EDF control circuit 9 as will be described based on FIG. 2.

Then, the above-described EDFA 1 each is configured as shown in FIG. 2, respectively. Namely, as is the case with the configuration (the two stage amplification configuration) described above in reference to FIG. 9, there are, as the optical circuit section, provided: EDFs 100a and 100b, each of which is optical amplification media; a variable optical attenuator (VOA) 101 provided between these EDFs 100a and 100b for adjusting the optical level (the amount of loss); beam splitters (BS) 102a as well as 102b, and photo-diodes (PDs) 103 as well as 104, which constitute the monitoring circuit of the input/output light level of EDF 100a arranged in the pre-stage; an excitation light source (LD) 105 and a WDM coupler 106 which constitute an excitation light circuit for EDF 100a; BS 107a as well as 107b, and PD 108 aw well as 109 which constitute the monitoring circuit of the input/output light level of EDF 100b arranged in the post-stage; and an excitation light source (LD) 110 and a WDM coupler 111 which constitute the excitation light circuit for EDF 100b.

Moreover, there are provided: as the control circuit section (electric circuit section), an AGC circuit 11 which carries out the gain control of EDFs 100a and 100b; an ALC circuit 12 which controls the amount of attenuation (the amount of loss) of VOA 101; an EDF control circuit 9 which performs the setting of various kinds of desired values for these AGC circuit 11 and the ALC circuit 12 and the like; an interface between the amplifier and the device 8 which interfaces between the EDF control circuit 9 and the device control circuit 5.

Here, the AGC circuit (constant-gain control unit) 11 adjusts (controls), based on the input/output light power of each of EDFs 100a and 100b, the excitation light power of LDs 105 and 110, so that a total gain (total gain=G1+G2) of each of EDFs 100a and 100b may be kept constant (the desired value of the amplifier gain which is set from the amplifier control circuit 9). For this reason, the AGC circuit 11 of this embodiment is comprised of, as shown in FIG. 2, comparators 13, 14, and 15, an adder 16, and a subtractor 17.

The comparator 13 obtains the difference, namely the input/output light power ratio (gain), of the output light power of EDF 100a (detected by PD 104) in the pre-stage and the input light power of EDF 100b (detected by PD 108) in the post-stage, while the comparator 14 obtains the difference (namely, the gain loss by VOA 101) of the input light power to EDF 100a (namely, the input light power to the whole EDFA 1, which is detected by PD 103) and the output light power of EDF 100b (namely, the output light power of the whole EDFA 1, which is detected by PD 109).

Moreover, the subtractor 17 obtains the difference (namely, the gain) of the pure input/output light power by EDFs 100a and 100b, which subtracts the gain loss due to VOA 101 from the input/output power of the whole EDFA 1 by subtracting the output of the comparator 13 from the output of the comparator 14, while the comparator 15 obtains the difference between the output of this subtractor 17 and the desired value of the amplifier gain (G1+G2), which is set from the EDFA control circuit 9, and thus each of the excitation light power of LDs 105 and 110 is controlled such that this difference may be minimized (namely, the total gain of EDFA 1 will become the desired value of the amplifier gain) by providing this difference to each of LDs 105 and 110.

Then, the adder (ASE correction unit (a first ASE correction section)) 16 corrects (increases the gain by the amount of the ASE correction value) the control errors which could be generated regarding the AGC control due to the ASE, which control errors are generated along with the amplification by EDF 100a and 100b, as an offset to the input monitor by reflecting (adding) an ASE correction value (a first ASE correction information), which is set from the EDFA control circuit, on the output of PD 103. In addition, the ASE correction control method itself is not limited to this. For example, the ASE correction value may be reflected on the output of PD 104 instead of on the output of PD 103.

On the other hand, the ALC circuit (the constant output level control unit) 12, also in this embodiment, in order to absorb the input fluctuation (input dynamic range) per one wave of the WDM light and obtain a constant output signal level, controls the output light level of the whole EDFA 1 so as to be constant (the output-desired value set from the EDFA control circuit 9) by adjusting the amount of attenuation of VOA 101 based on the monitoring value of PD 109 (namely, the output light level of EDF 100b in the post-stage), and, as shown in FIG. 2, the difference of the output of PD 109 and the output-desired value from the EDFA control circuit 9 is obtained by a comparator 18, and the amount of loss of VOA 101 is adjusted so that this difference may be minimized. However, in this case, also in this example, the ASE correction value (a second ASE correction information) is reflected on the above-described output-desired value by an adder (ASE correction unit (a second ASE correction section)) 19 so as to correct the control errors, which could be generated due to the ASE regarding the ALC.

In the EDFA 1 of the above configuration, in the state (mode) of ALC, the output power is detected in an optical monitor (PD 109), and the amount of loss in VOA 101 is adjusted by the ALC circuit 12 so that this output power may be constant (the output-desired value), while in the state (mode) of AGC, the total gain based on each of EDF 100a and 100b is detected by optical monitors (PDs 103, 104, 108, and 109) arranged in the preceding and post-stages of each of EDFs 100a and 100b, and the excitation light power of LDs 105 and 110 is adjusted by the AGC circuit 12 so that this gain may be constant (the desired value of the amplifier gain). In addition, the output level and the EDF gain in EDFA 1 need to be controlled so as to be constant for each operation mode, and, therefore, are controlled against the input fluctuation (within the input dynamic range) per one wave of the WDM light.

Moreover, in such a control, as described earlier, because the ASE correction value to be corrected in its own stage is dependent on the input power per one wave, the ASE correction value is added, in order to correct the amount of noise generated due to the ASE, to the output (the input monitoring value) of PD 103 and to the output-desired value for the comparator 18 by the adders 16 and 19, respectively, and is reflected on each desired control value regarding the AGC and the ALC (ASE correction step). As a result, various kinds of desired control values (the desired output value, the desired value of the amplifier gain, the VOA loss-desired value) in the state of ALC will be expressed in the following equations, (2), (3), and (4), when reflecting the ASE correction value.

$$\text{Desired output value [dB]} = \text{Desired value of output power per one wave [dBm/ch]} + 10 \times \text{Log}(m) + \text{Gase\_total} \quad (2)$$

$$\text{Desired value of amplifier (EDF) gain [dB]} = \text{EDF gain setting value [dB]} + \text{Gase}_k \quad (3)$$

$$\text{Desired value of VOA loss [dB]} = \text{Desired value of EDF gain} - \text{amplifier gain monitor value} \quad (4)$$

Here, "m" in the equation (2) denotes a wavelength number; and "EDF gain setting value" in the equation (3) denotes a predetermined value to be set for the operation mode of EDFA 1 by the device control circuit 5; and "Gase_total" in the equation (2) denotes the gain equal to the increased output portion due to the ASE (the accumulated portion up to the pre-stages+the generated ASE portion in its own stage), and "Gase_k" in the equation (4) denotes the gain equal to the increased output due to the ASE in its own stage (k), respectively. Moreover, the "amplifier gain monitoring value" in the equation (4) is obtained by the ratio of the monitoring values of the input PD 103 and the output PD 109.

Figure 3:
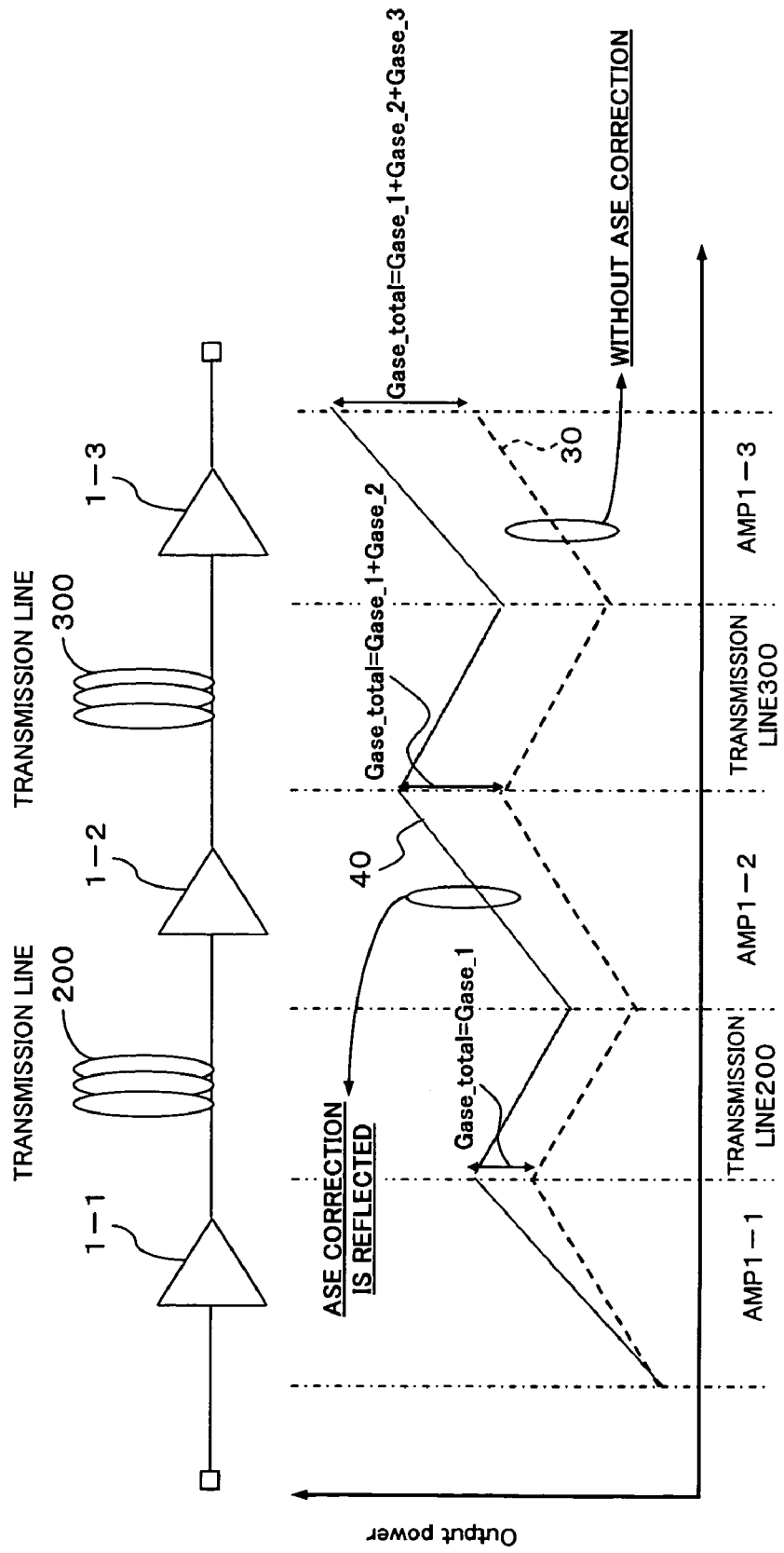
FIG. 3 is a view showing an example of changes of the output power when three sets of optical amplifiers (EDFA) are coupled in multi-stages.

In FIG. 3, a level diagram (changes of the output power in each transmission section) at the time of three sets of EDFA (AMP) 1-1, 1-2, and 1-3 being coupled in multi-stages through transmission lines 200 and 300 is shown. In this FIG. 3, the dotted line 30 shows changes of the output power without the ASE correction, and the solid line 40 shows changes of the output power when the ASE correction has been made in each EDFA 1-k (k=1, 2, 3). The output power of EDFA 1-1 is increased by the amount (Gase_total=Gase_1) of the ASE generated in its own stage (k=1), the output power of EDFA 1-2 is increased by the amount (Gase_total=Gase_1+Gase_2) of the ASE generated in the pre-stage (k=1) and its own stage (k=2), and the output power of EDFA 1-3 is increased by the amount (Gase_total=Gase_1+Gase_2+Gase_3) of the ASE generated in the stages prior to its own stage (k=3), and in its own stage (k=3).

Accordingly, the output-desired value of each EDFA 1-k coupled in multi-stages should be caused to reflect the increased output portion (Gase_total) due to the ASE correction values in the stages prior to its own stage and in its own stage, and as a result, the signal level of each channel (wavelength) is controlled constant at a desired output level. In addition, the ASE correction information of each inter-stage is usually transferred by the OSC or the like.

Here, the amount of increased output (referred to as a) due to the ASE correction unit the following equation (5).

$$a\ [dB]=10\times Log_{10}\ (a\ total\ output\ power/an\ output\ signal\ power)=10\times Log_{10}[((m\times Pin\ [mW/ch]+ASEin)\times Gain+ASEout)/(m\times Pin\ [mW/ch]\times Gain)]] \quad (5)$$

However, "ASEin" denotes the ASE power to be inputted to EDFA 1, and "ASEout" denotes the total output power to be outputted, and "m" denotes the wavelength number, respectively, and in the numerator of the logarithmic function, "m×Pin+ASEin" is detected (monitored) by the input PD 103 (108), "Gain" is calculated from the monitoring values of the input PD 103 (108) and the output PD 104 (109), and "ASEout" is set from the device control circuit 5. Each value of the denominator of the logarithmic function is set by the device control circuit 5.

Figure 4:
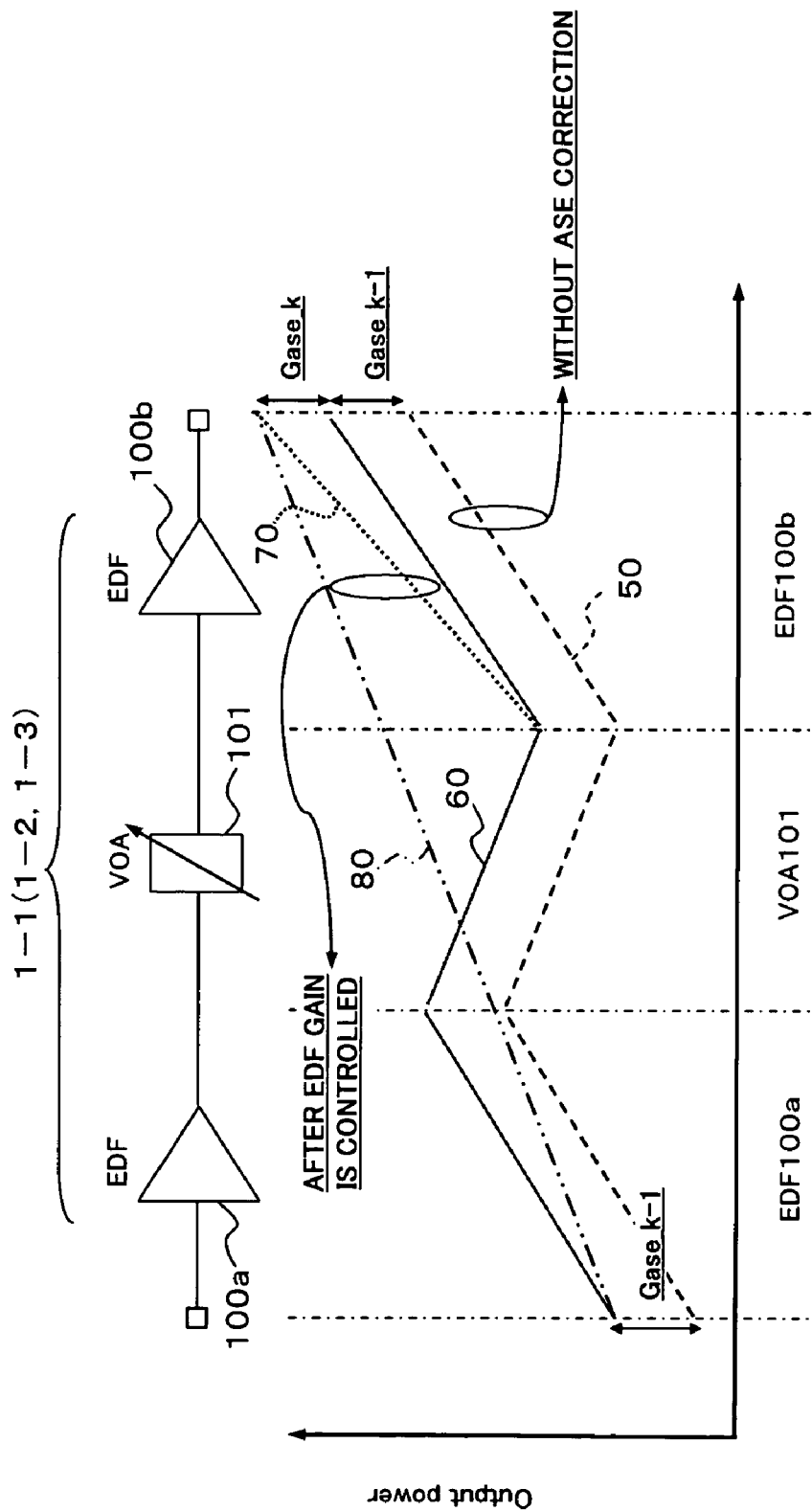
FIG. 4 is a view showing an example of the changes in the output power inside the optical amplifier.

Moreover, in FIG. 4, a level diagram (changes of the output power in each section) inside each EDFA 1-k, which is coupled in multi-stages, is shown. In this FIG. 4, the dotted line 50 shows the changes of the output power inside each EDFA 1-k when the ASE correction is not made in each EDFA 1-k, while the solid line 60 shows the changes of the output power when the ASE correction is made in the pre-stage (k−1) and the correction of the ASE portion (Gase_k) generated in its own stage (k) is not made, and the dotted line 70 shows the changes of the output power when the correction (EDF gain control) of the ASE portion generated in its own stage (k) has been made.

Thus, in order to prevent the occurrence of a gain deviation in each EDFA 1-k, the EDF constant-gain control is carried out in the state of ALC, however, in this desired control value (the EDF gain-desired value), it is necessary to add the EDF gain by the increased amount of the output (Gase_k) due to the ASE in its own stage (k), as expressed by the above equation (3) (refer to the dotted line 70). This "Gase_k" is given by "Gase_total in its own stage"−"Gase_total in the post-stage".

Incidentally, in EDFA 1, which realizes a high-speed response corresponding to the increase and decrease of the wavelength number, the AGC control is always carried out and the input/output gain is kept constant. In the configuration of FIG. 2, the high-speed control will be carried out using the input PD 103 (108) and the output PD 104 (109), such that "Pin×Gain−Pout" may become the minimum ("0"). Moreover, in FIG. 4, as shown by the dotted line 70, the gain addition by the amount of "Gase_k" is performed by controlling the gain of EDF 100b, however, the gain of EDF 100a may be controlled if an increase by the amount of "Gase_k" is realized. In other words, as the whole EDFA 1-k, the AMP gain as shown by the two-dot chain line 80 in FIG. 4 has only to be obtained. Usually, the setting of such a level diagram is designed taking the characteristics of the gain deviation, NF and the like into consideration.

Problems at the Time of the Increase and Decrease of Wavelength Number

Incidentally, when the increase and decrease of the wavelength number occurs in the state of ALC, no ASE correction information (a, Gase_k) in the state of ALC expressed by the above equation (5) can be calculated unless the correct wavelength information is obtained. Then, usually, the wavelength number information (m) is the information to be notified to the post-stage by the OSC or the like, and in a device in which the wavelength number is arbitrarily set between the optical nodes, it takes a predetermined period of time after a wavelength number changes till the correct information is notified, so that the correct wavelength number information cannot be recognized during this period of time in the state of ALC.

Accordingly, in the state of ALC, as described above, input changes due to the fluctuation of the wavelength number is interpreted as the input fluctuation per one wave, and the ASE correction information which should originally be reflected cannot be obtained, and thus a deviation from the desired value will occur in the output level, the EDF gain, and the like. Then, in this embodiment, there is provided a configuration in which the correction (ASE correction) of the control errors regarding the gain and the output level of the EDFA 1, which control errors are generated due to the ASE, is controlled based on a predetermined time constant by the EDF control circuit 9.

Figure 5:
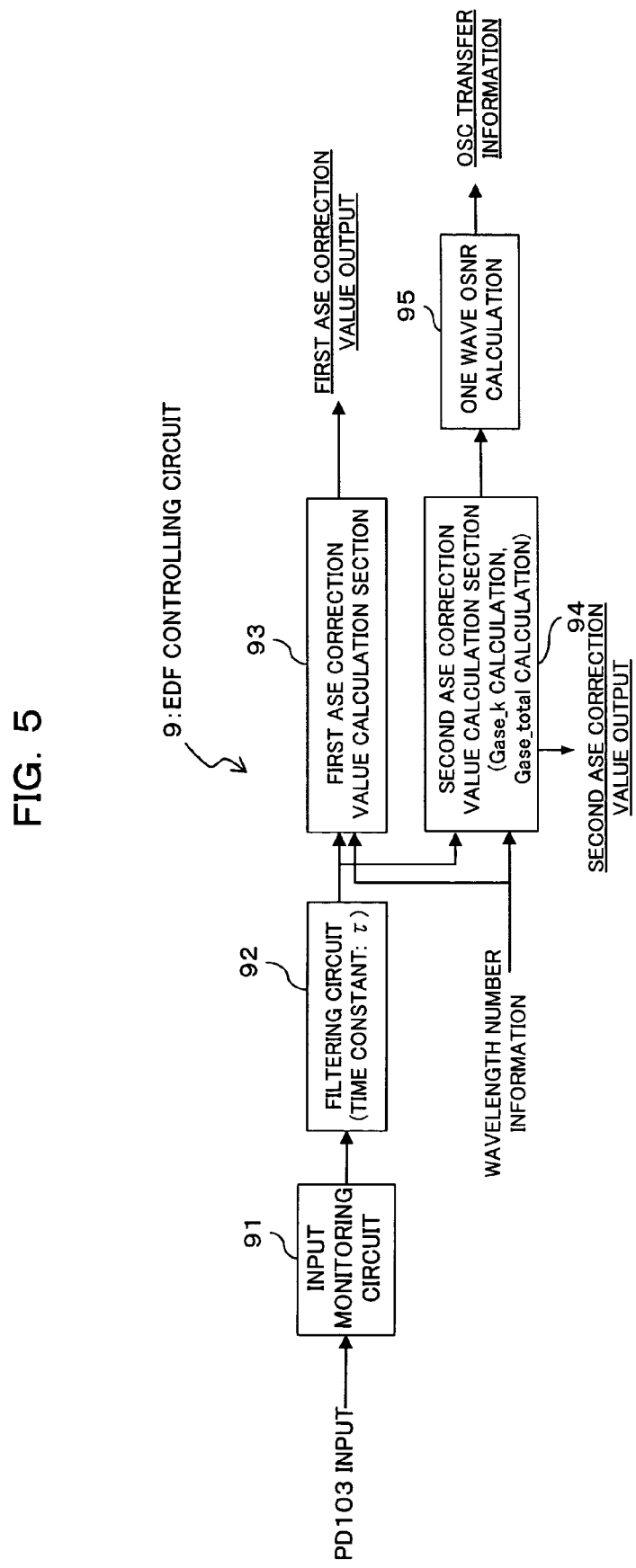
FIG. 5 is a block diagram showing the configuration of an EDF control circuit 9 shown in FIG. 2.

For this reason, the EDF control circuit 9 is, for example, as shown in FIG. 5, is comprised of an input monitoring circuit 91, a filtering circuit (a time-constant circuit) 92, a first ASE correction value calculation section 93, a second ASE correction value calculation section 94, and a one wave OSNR calculation section 95, and is used for a calculation of the ASE correction information and the noise transfer information for the next stage by giving a predetermined time constant to the input monitoring information used for the calculation of the ASE correction information.

Here, the input monitoring circuit 91 has a function to convert the monitoring value (a voltage value) of PD 103 into a digital value as the input monitoring information used for the calculation of the ASE correction information, and the filtering circuit 92 outputs, with a predetermined time constant t, the digital monitoring value from this input monitoring circuit 91, and when the input fluctuates, it performs a function to reduce this speed and output. And, the first ASE correction value calculation section 93 calculate, based on the digital monitoring value from this filtering circuit 92, the first ASE correction value (Pase/G×m×Pin_ch) caused to be reflected by the adder 16 (refer to FIG. 2).

The second ASE correction value calculation section 94 calculates, based on the above-described digital monitoring value from the filtering circuit 92, the second ASE correction value (Gase_k="Gase_total in its own stage"−"Gase_total in the post-stage") caused to be reflected by the adder 19 on the output-desired value, and the one wave OSNR calculation section 95 calculates, as the noise transfer information for the next stage, the quantity equivalent to the one wave OSNR (the ratio of the ASE output in its own stage per resolution wavelength, and the one wave signal output), wherein the obtained information is transferred to the next stage via the OSC transmit section 6 (refer to FIG. 1). Namely, this one wave OSNR calculation section 95 functions as the ASE information transferring section which outputs, with a predetermined time constant t, the information regarding the ASE (ASE information) to be transferred to other optical amplifiers.

Namely, the EDF control circuit 9 according to this embodiment functions as the ASE correction controller (the ASE correction information setting section) which controls (performs the ASE correction control step), based on the predetermined time constant t, correction of the control errors by means of the adders (ASE correction section) 16 and 19 (which ASE correction controller sets, with the time constant t, the above-described each ASE correction information for the adders 16 and 19).

The EDF control circuit 9 having the above functions can be constituted using a microcontroller or a digital signal processor (DSP), and memories, such as ROM or the like, which includes parameters used for the calculation of the control information. Moreover, the above described time constant t of the ASE correction control is set sufficiently slow with respect to the speed of the increase and decrease of the wavelength number, and is made a setting value feasible for the usual ALC operation. Specifically, the time constant t of the ASE correction value calculation needs to be in agreement with the time constant of the ALC which absorbs the input power fluctuation per one wave, or needs to be set sufficiently slower than the speed of the increase and decrease of the wavelength number.

This is because an deviation would occur in the ASE correction value calculation at the time of the fluctuation of the wavelength number, if the time constant t should be set not so slow with respect to the speed of the increase and decrease of the wavelength number, and on the contrary, if the time constant should be set extremely slow, at the usual operation time without fluctuation of the wavelength number, an deviation occurs in the ASE correction value calculation at the important time of the ALC control. Usually, the case where there is assumed a control by means of the ALC is the one where there is to occur the input fluctuation per one slow wave, such as degradation with lapse of time or aging (the temperature fluctuation), wherein the above described time constant of the ALC is a sufficiently slow value as compared with the increase and decrease of the wavelength number, and the setting of the above described time constant t for the ASE correction control can be set sufficiently slow as compared with the increase and decrease of the wavelength number.

Figure 6:
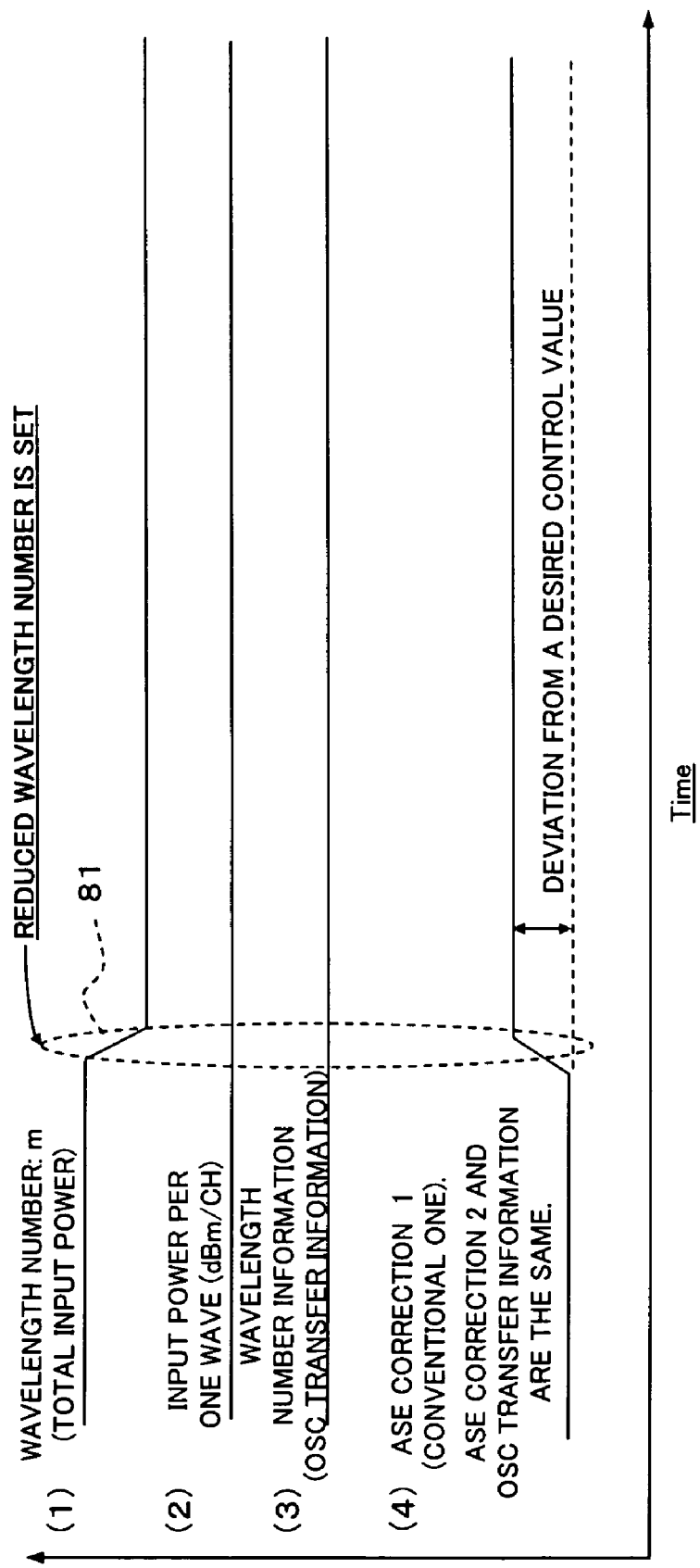
FIG. 6 is a view for explaining ASE correction control (at the time of the reduction of a wavelength) in the conventional optical amplifier.
Figure 7:
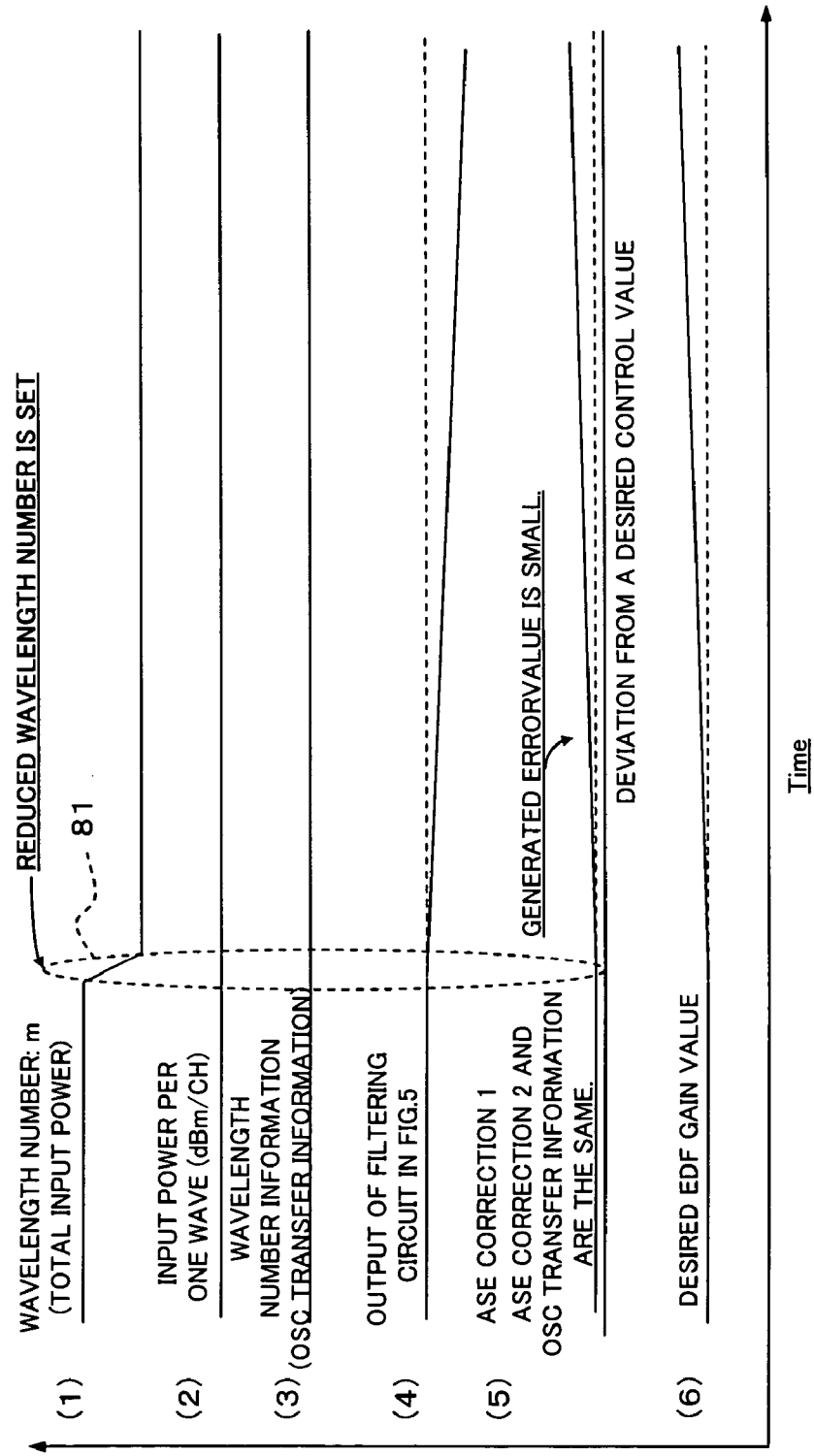
FIG. 7 is a view for explaining the ASE correction control (at the time of the reduction of a wavelength) in the optical amplifier of the present embodiment.

By setting the time constant t this way, a control as shown in FIG. 7 is realized. In addition, in the reflecting method of the ASE correction value according to the conventional technology, the operation will be as shown in FIG. 6, and the ASE correction deviation in its own stage and a deviation of the transferring information (noise information) to the post-stage will occur.

Namely, on the assumption that a wavelength reduction occurs in the state of ALC at the timing shown by the dotted line 81 in FIG. 6, then the total input power to the EDFA 1 decreases as shown in (1) in FIG. 6, however, at this time, there is no changes (too late for updating) in the wavelength number information recognized by EDFA 1 until the correct wavelength number information, after the reduction of the wavelength number, is transferred by the OSC or the like as shown in (3) in FIG. 6, therefore, despite that there is actually no changes in the input power per one wave as shown in (2) in FIG. 6, the reduction of the total input power is interpreted as due to the reduction of the input power per one wave, and as shown in (4) in FIG. 6, a deviation in the ASE correction information and in the transferring information for the post-stage will occur.

On the other hand, in the EDFA 1 of this embodiment, even if the reduction of the wavelength occurs, in the same way, at the timing shown as the dotted line 81 in FIG. 7, because the output of the filtering circuit 92, as shown in (4) in FIG. 7, changes gradually with respect to time due to the time constant t of the filtering circuit 92, the deviation of the ASE correction information and the transferring information to the post-stage also changes gradually as shown in (5) in FIG. 7. As a result, as shown in (6) in FIG. 7, the deviation of the EDF gain-desired value will also be slow with respect to time. Accordingly, the deviation of the EDF gain, the output power and the like can be reduced. In addition, the information shown by (1) through (3) in FIG. 7 is the same as the information shown in (1) through (3) in FIG. 6.

Likewise in the case of the increase of wavelength, it is possible to reduce the deviation in the EDF gain, the output power, the OSC transferring information, and the like, by giving a time constant t to the ASE correction information in the same way as the above described case of the reduction. Moreover, the time constant of the ALC, when the increase and decrease of the wavelength number is generated in the state of ALC, will be set so as to carry out a long cycle ALC, as described in the Patent Document 1.

Setup of Wavelength Number Information

Figure 8:
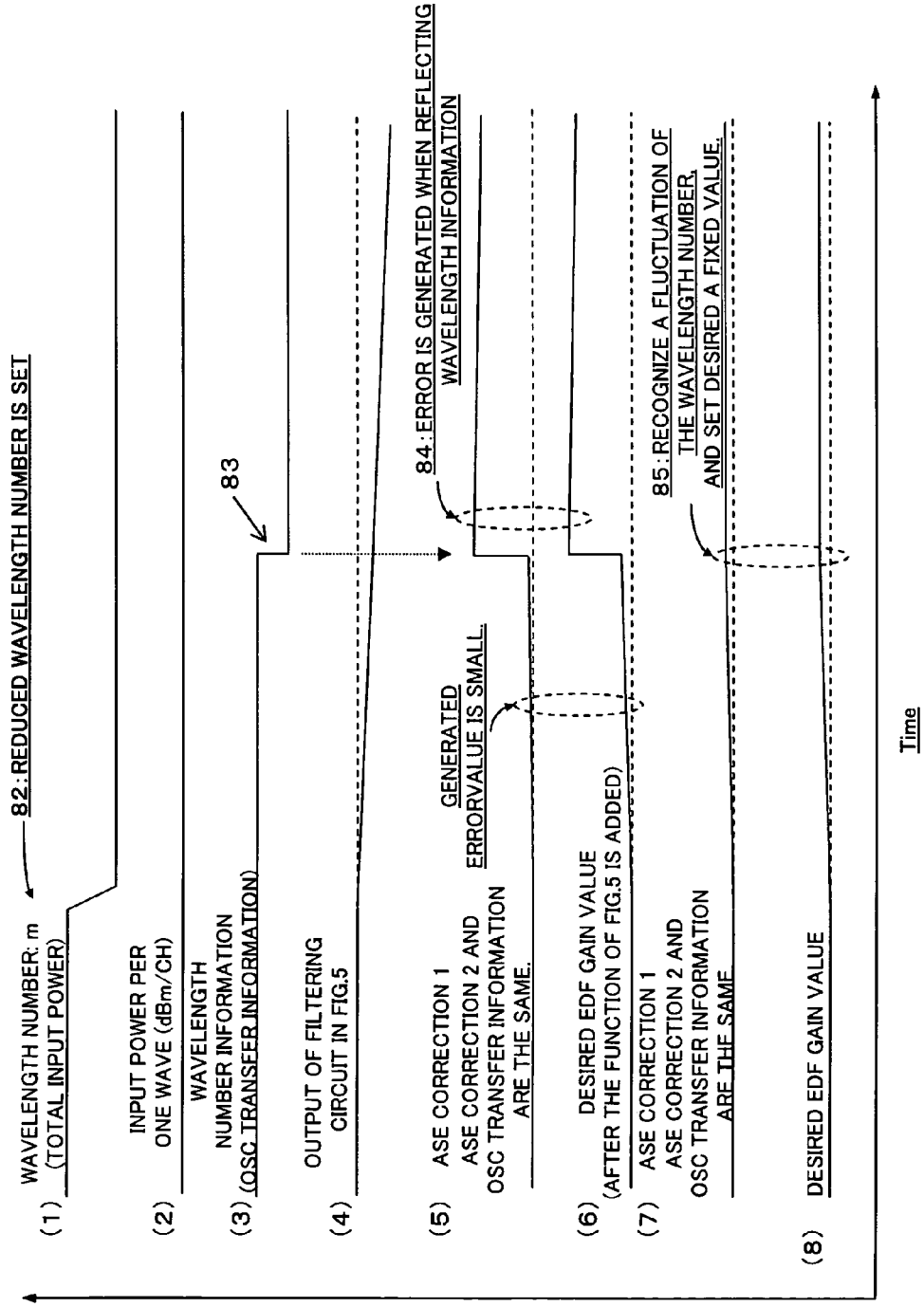
FIG. 8 is a view for explaining an operation (at the time of the reduction of a wavelength) at the timing of taking in the wavelength information in the optical amplifier of the present embodiment.

When causing the reflecting of the correct wavelength number information (m) having been transferred by the OSC or the like in the state of ALC after the increase and decrease of the wavelength number, an operation shown in FIG. 8 is assumed. Namely, the wavelength number information is needed for the calculation of ASE correction information (Gase_k), so that, after the reduction of the wavelength occurs at the timing shown as a numeral 82 in (1) in FIG. 8, in the event that there has been caused to be reflected the correct wavelength number information at the timing shown as a numeral 83 in (3) in FIG. 8, a large deviation would occur in the ASE correction information and the OSC transfer information for the post-stage, and a large deviation would occur also in the EDF gain-desired value and the like, as shown by a numeral 84 in (5) and (6) in FIG. 8.

Then, the EDF control circuit 9 of this embodiment, as shown by a numeral 85 in (7) and (8) in FIG. 8, when causing the reflecting of the correct wavelength number information, would fix the ASE correction information to the value prior to reflecting (receiving) the wavelength number information, while taking measures (a step of fixing the ASE correction information) such as setting the VOA loss-desired value to the current monitoring value (monitoring values of the PDs 104 and 108), thereby avoid an abrupt deviation from the desired value due to the reflection of the correct wavelength number information. Such a control can be realized by such a configuration that for example, the ASE correction value calculation sections 93 and 94 shown in FIG. 5, upon receipt of the correct wavelength number information from the device control circuit 5 via the OSC receiving section 4, fixes the output value to the theretofore output value.

Namely, the above-described ASE correction value calculation sections 93 and 94 would, upon receipt of the wavelength number information regarding the input light, perform also the function to fix the above-described ASE correction information to the information prior to receiving this wavelength number information regardless of the time constant t.

Thus, the process to fix (set from the current monitoring value) the control value of VOA 101 is an indispensable process since the ASE correction control is allowed to have the time constant t.

In addition, in order to avoid the above described abrupt deviation from the desired value at the time of taking in the above described wavelength number information, it is also made possible to cope with problems about errors by setting the time constant, which controls the amount of loss of VOA 101, so as to be sufficiently slow as compared with the speed of the increase and decrease of the wavelength number. Even if doing such, a desired value having slight errors with respect to the original control value can be set.

Moreover, if taking in the correct wavelength number information in the state that only AGC is operating, the setting process of the desired value of the VOA loss has only to be carried out at the time of the AGC transition, however, if the control is continued in the state of ALC, the final convergence value cannot be calculated from the correct wavelength number information, so that errors would occur in the ASE correction information after a predetermined period. In order to avoid this operation, it is necessary to cause transition into the state of AGC within a predetermined period (before the control value deviates out of the allowable ranges) after the increase and decrease of the wavelength occurs during ALC. By reflecting the correct wavelength number information and the control information, and causing transition into the state of ALC again from this state, the stabilization of the output level and the total EDF gain, and the like can be attained.

As described above, according to this embodiment, the following effects or advantages are obtained.

(1) The occurrence of ASE correction errors in the increase and decrease of the wavelength number during ALC can be reduced, and the stability of the output level after fluctuation of the wavelength number can be ensured.

(2) By reflecting ASE correction information with few errors on the EDF gain control value, degradation of the transmission quality, which is a concern at the time of the increase and decrease of the wavelength number during ALC, can be prevented.

(3) Since the deviation of ASE correction information generated in its own stage is reduced, it is made possible to carry out the control accurately using the ASE correction information, which is to be transferred to the next stage, regardless of the occurrence of the increase and decrease of the wavelength number.

In addition, needless to say, the present invention is not limited to the above-described embodiment, but various variations and alternatives of the embodiment can be implemented without departing from the scope of the present invention.

For example, although in the above-described embodiment, there is provided a configuration for performing the ASE correction as an offset of the ALC section and the AGC section, the present invention is not limited to this, but a configuration for carrying out the ASE correction in either one of them may be made.

Moreover, in the above described embodiment, the case where the optical amplifier is constituted as an EDF light amplifier using EDF as a rare earth doped optical fiber has been described, however, the present invention is not limited to this, but is applicable, in the same way, to optical amplifiers in which the ASE could be generated along with the amplification of the input light, and the same working effects as the above described can be obtained.

As described in detail above, according to the present invention, the occurrence of ASE correction errors in the increase and decrease of the wavelength number during ALC can be reduced, and thereby the stability of the output level of an optical amplifier after a fluctuation of the wavelength number can be ensured, which is considered extremely useful in the optical-communications technical field.

What is claimed is:

1. A method of controlling an optical amplifier that generates amplified spontaneous emission (ASE) in an output light when the optical amplifier amplifies an input light, comprising:
    correcting control errors generated due to the ASE when a wavelength number changes, the control errors pertaining to at least one of a gain and an output level of the optical amplifier; and
    controlling the correction of control errors generated due to the ASE based on a predetermined time constant.

2. The method of controlling the optical amplifier according to claim 1, wherein
    the controlling controls the correction of control errors regarding a constant-gain control and a constant output level control of the optical amplifier based on the predetermined time constant.

3. The method of controlling the optical amplifier according to claim 2, wherein
    the controlling includes outputting ASE transfer information to be transferred to other optical amplifiers based on the predetermined time constant.

4. The method of controlling the optical amplifier according to claim 1, wherein
    the predetermined time constant is set to the same value as a time constant regarding a constant-gain control.

5. The method of controlling the optical amplifier according to claim 1, wherein
    the optical amplifier is constituted as a rare earth doped optical fiber amplifier.

6. The method of controlling the optical amplifier according to claim 5, wherein
    the rare earth doped optical fiber amplifier is constituted as an erbium-doped optical fiber amplifier.

7. A method, comprising:
    controlling an optical amplifier to amplify a wavelength division multiplexed (WDM) light including a plurality of lights at different wavelengths multiplexed together, said controlling incurring control errors regarding at least one of a gain of the optical amplifier and an output level of the optical amplifier due to amplified spontaneous emission (ASE) generated by the amplification of the WDM light; and
    correcting the control errors in accordance with a predetermined time constant, to thereby stabilize said at least one of a gain and an output level, when the number of wavelengths in the WDM light is being changed.

* * * * *